United States Patent [19]

Gerber

[11] Patent Number: 4,916,819
[45] Date of Patent: Apr. 17, 1990

[54] PROGRESSIVE PLOTTER WITH UNIDIRECTIONAL PAPER MOVEMENT

[75] Inventor: Heinz J. Gerber, West Hartford, Conn.

[73] Assignee: Gerber Garment Technology, Inc., Tolland, Conn.

[21] Appl. No.: 195,128

[22] Filed: May 17, 1988

[51] Int. Cl.⁴ .......................................... G01D 15/00
[52] U.S. Cl. ............................... 33/18.1; 346/139 R; 33/1 M
[58] Field of Search ............... 33/1 M, 18.1, 32.3, 33/32.4, 35; 346/139 R, 139 A, 139 B, 136; 226/8, 122, 134

[56] References Cited

U.S. PATENT DOCUMENTS

| | | | |
|---|---|---|---|
| 3,673,604 | 6/1972 | Gordon | 346/139 B |
| 4,091,980 | 5/1978 | Gerber | 226/162 |
| 4,328,726 | 5/1982 | Pearl | 83/39 |
| 4,391,170 | 7/1983 | Boverman et al. | 83/71 |
| 4,400,704 | 8/1983 | Brown et al. | 346/29 |
| 4,512,079 | 4/1985 | Le Blond | 33/1 M |
| 4,524,520 | 6/1985 | Levy | 33/1 M |
| 4,527,119 | 7/1985 | Rogers et al. | 33/1 M |
| 4,630,071 | 12/1986 | Nakazawa | 226/8 |

FOREIGN PATENT DOCUMENTS

1073991 6/1967 United Kingdom .
1073994 6/1967 United Kingdom .

Primary Examiner—William A. Cuchlinski, Jr.
Assistant Examiner—Patrick R. Scanlon
Attorney, Agent, or Firm—McCormick, Paulding & Huber

[57] ABSTRACT

An X,Y plotter for drawing drawings of great length has a plotting area over which paper is moved in one direction parallel to the length of the paper and drawing to be produced. A pen is moved in X and Y coordinate directions relative to the plotting area, by X and Y carriages, to draw on the portion of the paper currently at the plotting area. The elongated one of the two carriages extends parallel to the length of the paper and is supported at its opposite ends by two stationary guide rails extending across the width of the paper and spaced by less than the width of the paper to allow the carriages to be made of small size and light weight. Associated means for providing precise tracking and advancement of the paper are also described.

35 Claims, 7 Drawing Sheets

PROGRESSIVE PLOTTER WITH UNIDIRECTIONAL PAPER MOVEMENT

BACKGROUND OF THE INVENTION

This invention relates to plotters of the type where a pen or other drawing instrument is movable in X and Y coordinate directions relative to a surface supporting a sheet of paper or other sheet material to draw figures, characters and other graphics on the sheet material; and deals more particularly with improvements in such a plotter particularly suited to producing drawings of great length on elongated webs of sheet material, such a drawing being drawn progressively from one of its ends to the other in conjunction with movement of the material over the support surface in one direction parallel to its length.

The plotter of the invention is useful, for example, in the garment industry for drawing markers showing pattern pieces to be cut from a length of fabric. In such application the plotter may be part of a computer assisted pattern grading and marker making system as shown, for example, by U.S. Pat. No. 3,887,903. In this case the sheet material on which the drawing or marker is made is usually paper and the writing instrument is usually a pen. Therefore, for convenience, in the following description and in the accompanying drawings the sheet material is referred to and shown as paper and the writing instrument is referred to and shown as a pen. Other sheet materials and writing instruments may however be used without departing from the invention. It is indeed within the purview of the invention that the plotter may be implemented as a photoplotter with the material on which the drawing is made being a photosensitive sheet or film and with the writing instrument being a beam of light moved over the sheet or film in a line drawing manner to expose lines on the sheet.

As used herein the term "progressive plotter with unidirectional paper movement" refers to a plotter, as suggested above, where a drawing of great length is produced by a pen movable in X and Y coordinate directions over and relative to the plotting area of a paper support surface with the plotting area having only a short dimension parallel to the length of the paper in comparison to the length of drawings to be drawn, with the paper being moved lengthwise in one direction over the plotting area as a drawing is created progressively along its length. A progressive plotter may operate with intermittent paper movement alternating with intermittent plotting, with continuous paper movement combined with continuous plotting, or with a combination of the first two possibilities.

In the first case the plotter may be referred to as a sectional (or section-by-section) plotter characterized in that a drawing to be drawn is divided into a number of sections arranged next to one another lengthwise of the drawing and is created by drawing it one section at a time. That is, the paper is arranged to present one section of it to the plotting area of the plotter, the paper is held stationary relative to the plotting area and the pen of the plotter is then moved in X and Y coordinate directions relative to the plotting area to draw a section of the intended drawing on the section of paper then at the plotting area. After this section of the drawing is completed the paper is advanced lengthwise to bring a next section of paper to the plotting area and the paper is again then held stationary and the pen moved in the X and Y coordinate directions to draw the next section of the drawing on the section of paper then at the plotting area. This process is repeated section by section until the drawing is finished.

In the second case mentioned above the plotter is operated to draw on the paper, by movement of the pen in X and Y coordinate directions over the plotting area, while the paper is moved over the plotting area continuously in one direction along its length. This means that if at a given point along the length of the drawing a number of lines extend generally lengthwise of the drawing it may be necessary for the pen to draw some or all of such lines in parts, drawing first part of one line, then skipping to another line to draw part of it, and then later returning to the first line to draw another part of it.

In the third case mentioned above the plotter may be operated basically as a sectional plotter to draw most of a drawing one section at a time with the paper being intermittently advanced over the plotting area, but it is also operated so that the pen does some further drawing as the paper is advanced to bring a new paper section to the plotting area. For example, during a paper advancement the pen may be used to draw part of a longitudinally extending border line or to draw all or part of one or more other lines of the basic drawing.

It is presently thought that the plotter of this invention will most often be used for section-by-section drawing, so for convenience it is usually described hereinafter as operating in that way. However, there is no intention to limit the invention to such operation and it is to be understood that the plotter may also be used in other progressive drawing ways without departing from at least the broader aspects of the invention.

Progressive plotters operating in section-by-section fashion are known in the art and are shown, for instance, by U.S. Pat. No. 4,091,980 and U.S. Pat. No. 4,400,704. Such plotters, however, tend to be relatively expensive and to be of relatively massive construction. In particular, the moving parts, especially the X and Y carriages, are large and heavy, the plotter being accordingly either slow in operation or equipped with large and powerful drive motors and very robust associated mechanical drive systems. At least one of the carriages is also quite long and should be made of a heavy rigid construction and to be well supported to avoid vibrations and other deflections leading to drawing errors.

An important requirement of progressive plotters is that the paper track accurately over the plotting area so that in the case of lines necessarily made up of parts drawn at different times with the paper differently positioned relative to the plotting area, the trailing end of one part will coincide exactly with the leading end of the next part to show no discontinuities in a finished complete line. If the paper drifts laterally as it is advanced, or if it buckles or otherwise distorts during the advancement, unacceptable misregistration of line parts, or other drawing errors, are likely to occur.

In the garment industry a need exists for an inexpensive plotter capable of producing, with reasonable speed, accurate long drawings or markers, such need not adequately being filled by presently available and known plotters.

The general object of this invention is therefore to provide an X,Y plotter capable of being made at relatively low cost and which nevertheless is operable to produce long drawings at good speed with a finished complete drawing being very presentable and free of errors such as discontinuities in what should be smooth uninterrupted lines.

A further object of the invention is to provide an X,Y plotter of the foregoing character wherein the plotter is a progressive one with unidirectional paper movement, the arrangement of its parts being such that the moving parts, particularly the X and Y carriages, may be made of relatively small size allowing them to have sufficient rigidity to inhibit vibrations and other deflections while nevertheless being kept light in weight, thereby further allowing them to be driven at acceptably high accelerations and decelerations by relatively low powered inexpensive motors and lightweight drive systems. In keeping with this object of the invention, the arrangement of parts is particularly such that the elongated one of the two carriages does not straddle the width of the paper; the length or the elongated carriage is therefore not dependent on the paper width and is instead of a length significantly, preferably several times, less than the paper width.

A further object of the invention is to provide a plotter of the foregoing character having a paper support and advancement system causing the paper to be advanced over the plotting area in such way as to resist or inhibit various paper tracking problems such as lateral shift, buckling, tearing or other distortion of the paper, or undershoot or overshoot of the paper as it is stopped at the end of any given advancement, such problem-free tracking of the paper assuring proper matching of line parts with one another.

Other objects and advantages of the invention will be apparent from the following description of a preferred embodiment and from the accompanying drawings and claims.

SUMMARY OF THE INVENTION

The invention resides in an X,Y plotter having a support surface with a plotting area and means for moving an elongated sheet of paper over the plotting area in one direction relative to the area and parallel to the longitudinal axis of the paper. Two parallel guide rails fixed relative to the support surface are arranged perpendicular to the direction of paper movement and extend across and beyond the full width of the paper. These two guide rails are spaced from one another by a distance substantially, and preferably several times, less than the width of the paper. An elongated main or Y carriage extends between the two guide rails and is supported at both of its ends by respective ones of the rails for movement along the length of the rails in the Y coordinate direction, and a pen or X carriage is supported for movement in the X coordinate direction, along the Y carriage, and carries a pen for drawing lines on the sheet material supported by the plotting area of the support surface.

The invention also resides in the fact that the arrangement of parts is such that the support and take-up rolls for the paper are maintained close to one another so that the length of paper existing between the rolls is very short and less than the width of the paper so as to have little or no opportunity to buckle, shift laterally or otherwise deflect in passing from the supply roll to the take-up roll, and in the fact that the paper existing between the rolls is kept in tension and is shaped to give it yet greater strength and stiffness against buckling and lateral shift. In this regard the invention more particularly resides in the support surface for the paper having two parallel edges extending transversely of the direction of paper movement, in such side edges of the support surface being spaced close to one another, in the paper rolls being located very close to such side edges so that the portion of paper existing between the supply roll and the take-up roll is short and of a length less than the width of paper, preferably less than one half the width of the paper, in the paper being guided onto and off of the support surface in such way that it is bent to a significant degree around each of the side edges, and in the paper which exists between the rolls being kept in tension. This shortening, shaping and tensioning of the paper existing between the two rolls gives it high strength and stiffness, especially against buckling and similar distortion and against shifting of the paper at one side edge of the support surface in a direction parallel to that edge and relative to the portion of the paper engaging the other side edge of the support surface.

The invention further resides in a paper advancement means allowing the paper to be advanced at relatively high speed but which nevertheless also allows the supply roll to be stopped without overshoot at the end of a paper advancement. In connection with this the plotter more specifically includes a drive for the take-up roll which is driven at a fast speed during most of an advancement and then driven at a slower speed during the terminal portion of the advancement; and also an inexpensive but efficient braking means is associated with the paper supply roll to stop rotation of that roll immediately upon the disappearance of tension forces pulling paper from the roll, the same braking means also serving to keep tension in the paper during advancement.

The invention also resides in other features of the plotter as described in more detail hereinafter and as stated in the claims.

DETAILED DESCRIPTION OF THE PREFERRED EMBODIMENT

Figure 1:
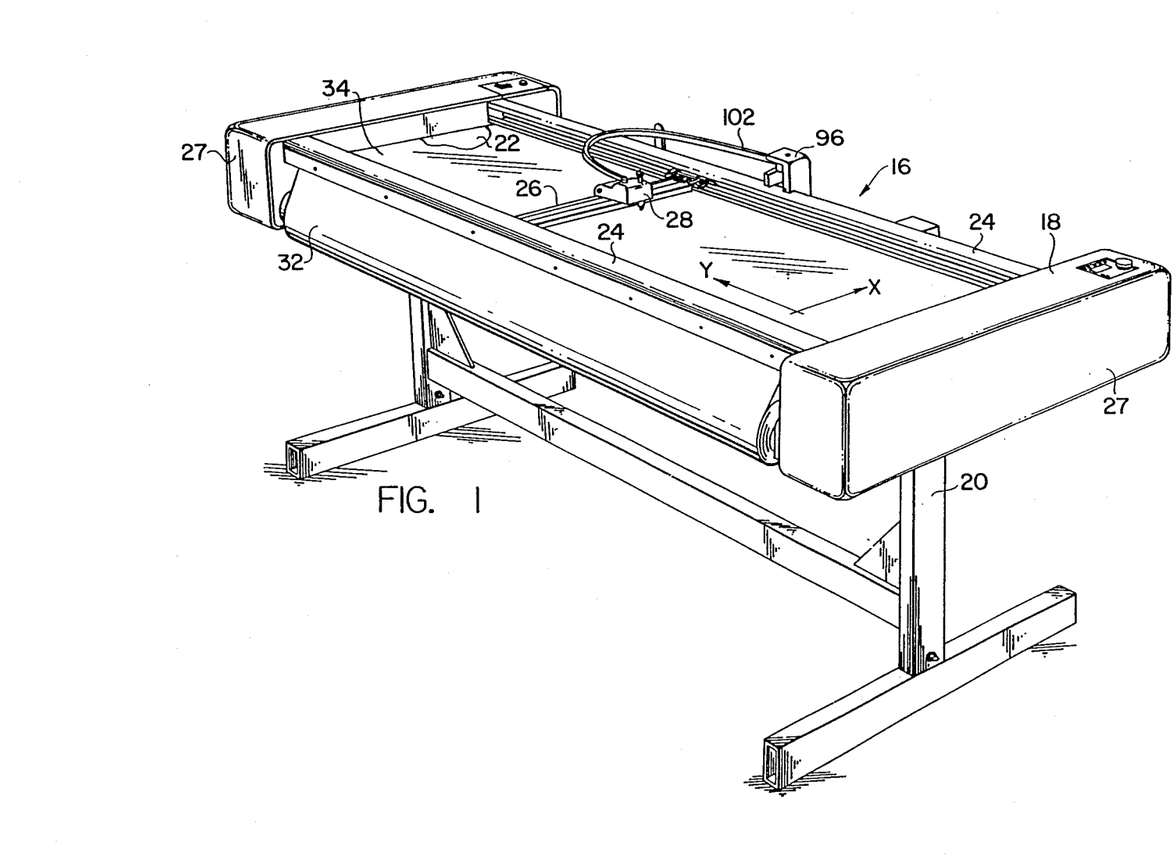
FIG. 1 is a perspective view of a plotter embodying the invention.
Figure 2:
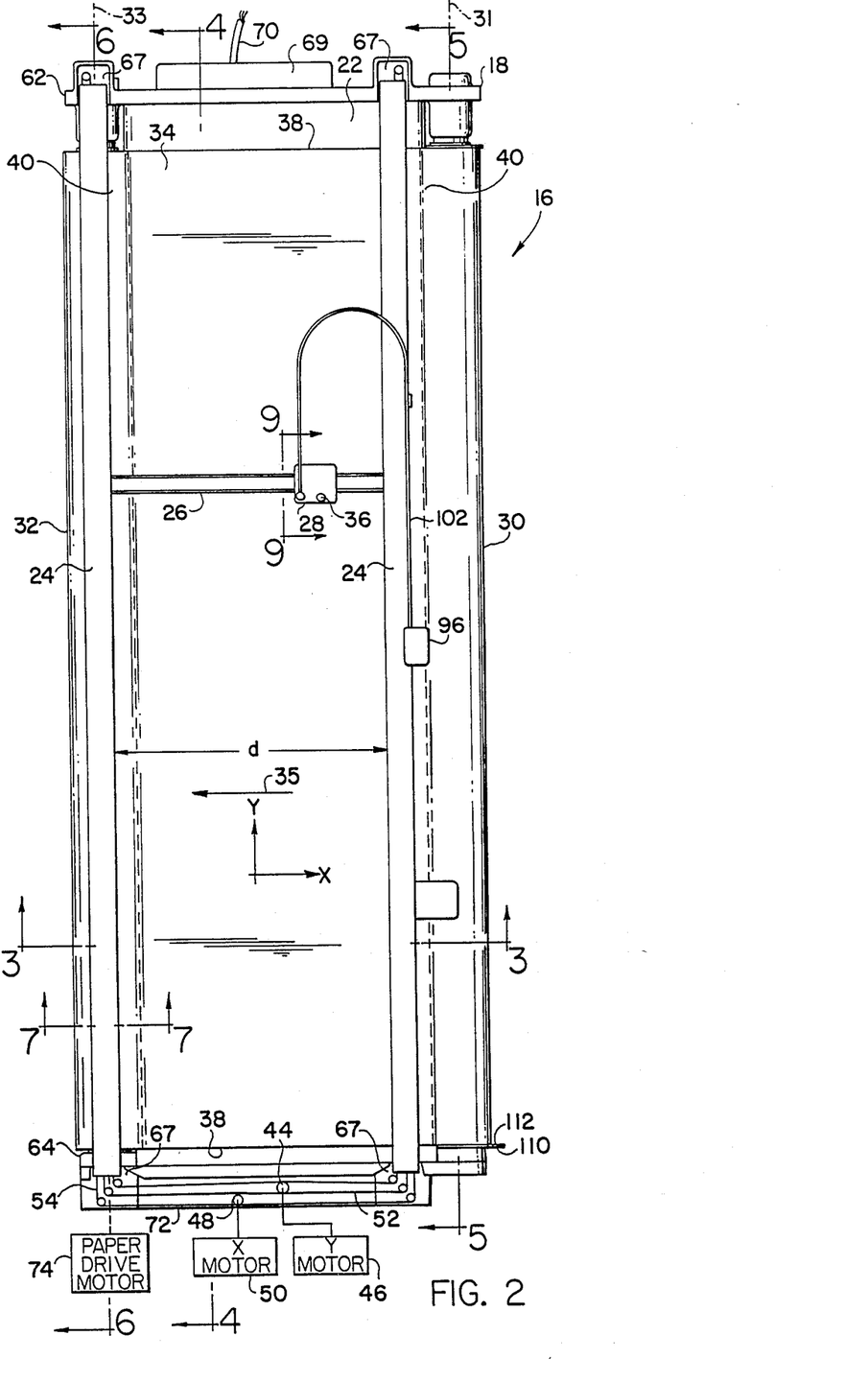
FIG. 2 is a plan view of the plotter of FIG. 1 with the end covers removed.

Turning to the drawings, and first referring to FIGS. 1 and 2, a progressive plotter embodying the invention is there generally shown by the reference numeral 16. It is made up basically of a table 18 having a suitable base structure 20 and an upwardly facing support surface 22, two parallel guide rails 24, 24, an elongated Y carriage 26 movable along the guide rails 24, 24 in the illustrated Y coordinate direction, and a pen or X carriage 28 movable along the Y carriage 26 in the illustrated X coordinate direction. In FIG. 1 the plotter is shown with two end covers 27, 27 in place. In FIG. 2 and other figures the end covers have been removed, some incidental parts have been omitted and other parts have been shown schematically to more clearly illustrate the invention.

As best seen in FIG. 2, the table 18 includes at its right-hand side means for removably supporting a supply roll 30 of paper for rotation about its central axis, and also includes means adjacent its left-hand side for removably supporting a take-up roll 32 of paper for rotation about its central axis 33. Paper 34 from the supply roll 30 is guided over the support surface 22 and wound upon the take-up roll 32 as explained in more detail hereinafter. Rotation of the take-up roll 32 to wind paper onto it pulls paper from the supply roll and moves the paper in the direction 35 extending parallel to the longitudinal axis of the paper. A lengthwise section of the paper is supported by the support surface 22 and may be drawn upon by a pen 36 carried by the pen carriage 28.

The plotter 16 is particularly adapted to the making of long drawings such as markers for the garment industry even though the plotting area has a dimension along the length of the drawing which is usually many times smaller than the drawing length. For example, in a given instance the paper 34 may have a width of 80 inches and a drawing made on the paper 34 may have a length of 30 to 50 yards or more. The support surface 22 is rectangular in shape and defined by two end edges 38, 38 and two side edges 40, 40 each having a relatively small radius of curvature, such as of less than one inch and preferably of less than one-half inch. The major part of the support surface 22 is a plotting area defined by the combined ranges of movement of the pen 36 in the X and Y coordinate directions.

In accordance with the invention the guide rails 24, 24, in addition to being fixed relative to the support surface 22 and extending perpendicular to the direction 35 of paper movement, are spaced closer to one another than the width of the paper 34 or of the range of movement of the pen parallel to the Y coordinate axis. Preferably they are spaced from one another by a distance d, as shown in FIG. 2, which is at least less than one half, or several times less than, the width of the paper 34. For example, in a specific instance, the paper 34, as mentioned, has a width of 80 inches. The support surface 22 between the edges 38, 38 has a width of about 85 ¼ inches and between the side edges 40, 40 has a length of about 24 ¾ inches. The pen 36 has a range of movement of 80 inches in the Y coordinate direction, which coincides with the width of the paper 34, and a range of movement of about 17 inches in the X coordinate direction, thereby defining on the support surface 22 a plotting area of approximately 17×80 inches. The distance d between the two side rails 24, 24 is approximately 22 ⅜ inches, which means the guide rail spacing d is approximately 3 ½ times less than the width of the paper 34 and of the associated plotting area of the support surface 22. The Y carriage 26 is elongated so as to extend between the two guide rails 24, 24, but the short spacing between the guide rails means that this carriage can be made of relatively small size and of light weight, and can be easily supported and guided at its two ends by the rails 24, 24 while still being made sufficiently resistant to vibrations and deflections to avoid plotting errors. Likewise the pen carriage 28 may also be made of a relatively small size and of light weight The small size and light weight of the carriages 26 and 28 further allows them to be made of relatively inexpensive construction and to be driven at acceptable accelerations and decelerations by relatively low powered and inexpensive motors.

Figure 11:
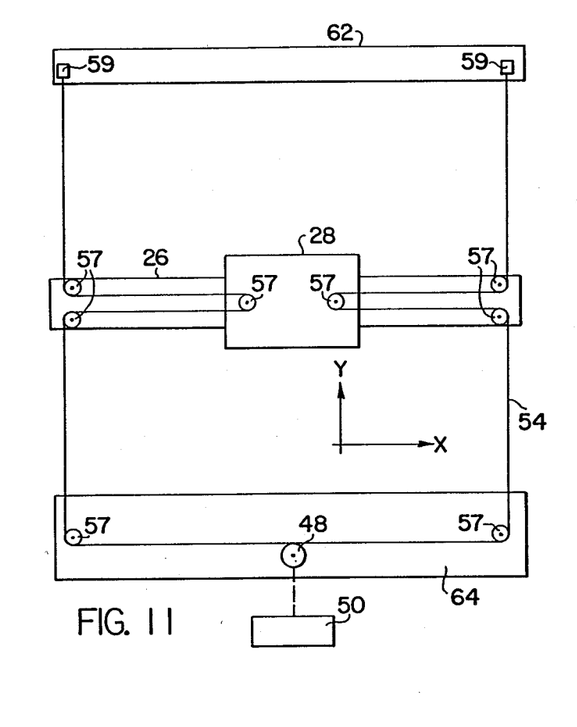
FIG. 11 is a schematic diagram of the cable drive for driving the X carriage in the X coordinate direction.
Figure 12:
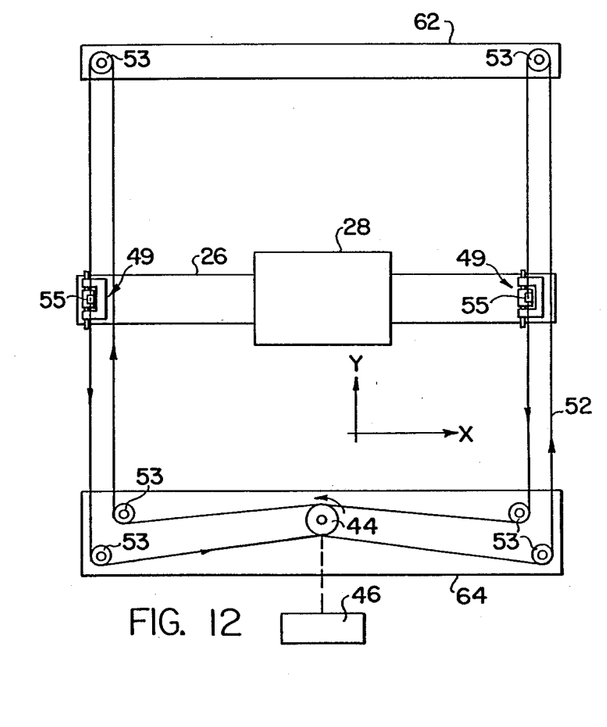
FIG. 12 is a schematic diagram of the cable drive for driving the Y carriage in the Y coordinate direction.

Various different means may be used for guiding and moving the carriages 26 and 28 in the Y and X coordinate directions respectively without departing from the invention. For example, as indicated in FIGS. 2, 11 and 12, the two carriages may be driven by generally conventional cable drives including a Y cable drum 44 driven by a Y motor 46 and an X cable drum 48 driven by an X motor 50. The drum 44 receives a cable 52 which through suitable pulleys 53 is fixed to the Y carriage 26 at both of its ends, as indicated at 55, 55, so that rotation of the drum 44 by the motor 46 will cause movement of the carriage 26 in one direction or the other along the Y axis. Likewise, the drum 48 receives a cable 54 connected with both ends of the pen carriage 28 through suitable pulleys 57, 57, and fixed at both or its ends to the plate 62, as indicated at 59, so that rotation of the drum 48 by the X motor 50 will cause movement of the pen carriage 28 in one direction or the other along the carriage 26 parallel to the X axis.

Figure 3:
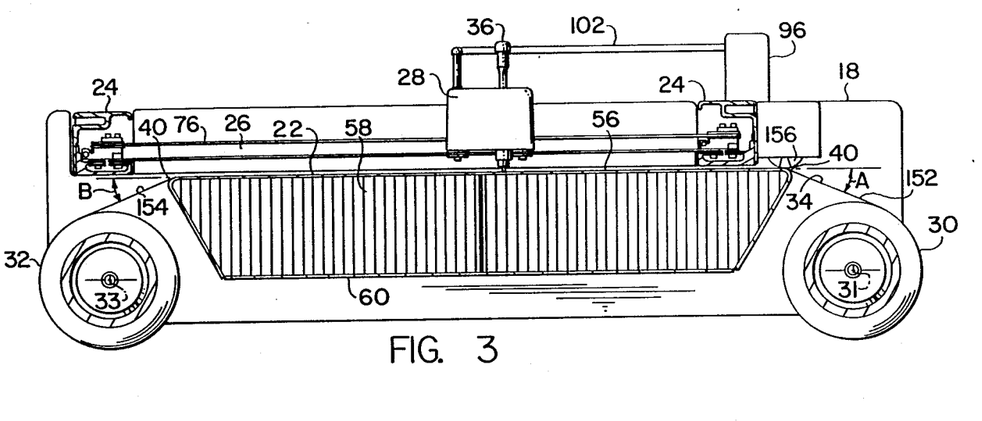
FIG. 3 is a vertical sectional view taken on the line 3—3 of FIG. 2.
Figure 4:
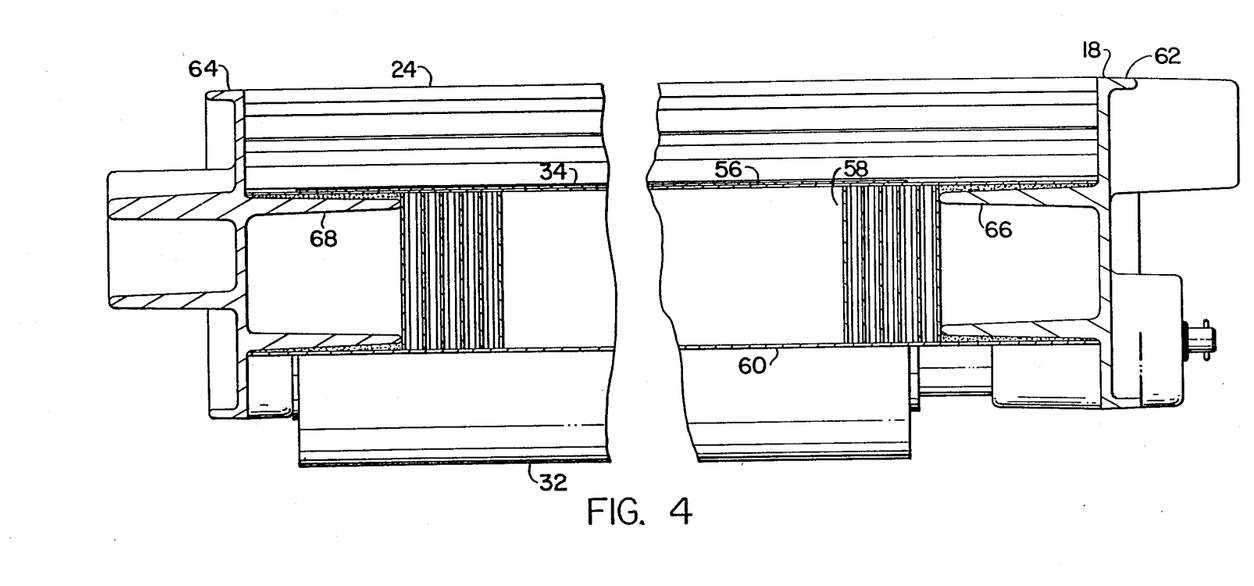
FIG. 4 is a vertical sectional view taken on the line 4—4 of FIG. 2.

FIGS. 3 and 4 show in more detail the construction of the table 18. Referring to these figures, as well as to FIG. 2, the support surface 22 is provided by a panel 56 having a core 58 of honeycomb material and an outer shell 60 of aluminum or other sheet material bonded to the honeycomb core to form a stable rigid unit. At each end of the table the panel 56 is rigidly fixed to an end plate 62 or 64 of cast aluminum or similar material. For this purpose each end portion of the panel 56, as seen in FIG. 4, is void of honeycomb material 58 and receives a complementary flange 66 or 68 of the adjacent end plate to which the shell 60 of the panel is fixed by adhesive or other means to form the panel 56 and end plates 62 and 64 into a single rigid unit. The guide rails 24, 24 are conveniently fixed to the remainder of the table by having their ends fixed in receiving pockets 67, 67 formed in the end plates 62 and 64. The end plates 62 and 64 also serve to support other parts of the plotter. For example, as shown in FIG. 2, the end plate 62 supports a control unit 69 which includes a digital processor, servo amplifiers and other electronic components as needed for control of the plotter, the unit 69 being connectable to other parts of a computer assisted marker making and grading system or the like through a cable 70. In particular, data defining drawings to be created by the plotter is supplied to it through the cable 70. This data is then processed by the processor and converted into commands controlling movement of the pen and paper in such way as to cause the pen to draw the drawings represented by the data on the paper. Further, the casting 64 as shown in FIG. 2 includes a bracket 72 supporting the X and Y cable drums 48 and 44 and the associated X and Y motors 50 and 46. The same end plate also supports a paper drive motor 74 for driving the take-up roll 32 as explained in more detail hereinafter.

Figures 7, 8, 9:
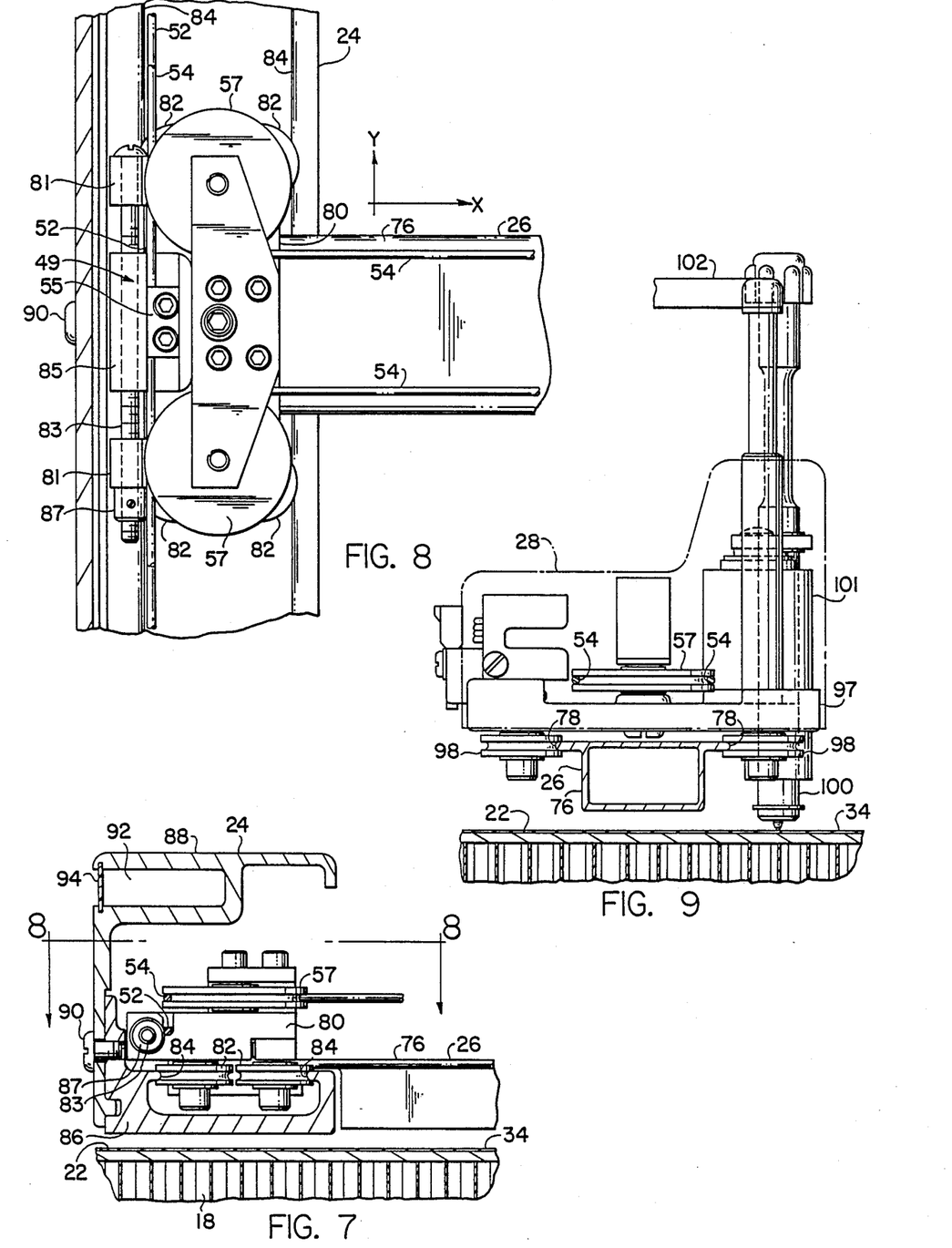
FIG. 7 is a fragmentary vertical sectional view taken on the line 7—7 of FIG. 2 showing the support for the main carriage.
FIG. 8 is a fragmentary horizontal sectional view taken on the line 8—8 of FIG. 7 showing the means for adjusting the adjacent end of the main carriage to bring that carriage into parallelism with the X axis.
FIG. 9 is a fragmentary vertical cross-sectional view taken on the line 9—9 of FIG. 2 showing the support for the pen carriage.

The construction and support of the X and Y carriages 26 and 28 may be seen from FIGS. 3, 7, 8, and 9. Referring to these figures, the main or Y carriage 26 is made up essentially of an elongated member 76, which may be an aluminum extrusion, having over most of its length a hollow rectangular cross-section, as seen in FIG. 9, with two laterally extending rail flanges 78, 78 located in a common horizontal plane extending along the major portion of the length of the member 76. At each of its ends, as shown for one end in FIGS. 7 and 8, the member 76 has fastened to it a block 80 rotatably supporting two sets of two grooved guide wheels for rotation about vertical axes. The block 80 is located within the associated guide rail 24 which in its lower portion includes two opposed laterally inwardly extending rail flanges 84, 84 located in a common horizontal plane and extending longitudinally of the guide rail 24. The two rail flanges 84, 84 are engaged by the four guide wheels 82, 82 to confine the guide block 80 to movement along the length of the guide rail 24.

Each guide rail 24 may be formed as a unitary extrusion of aluminum or the like, but preferably and as shown in FIG. 7 it is made as an assembly of two extrusions 86 and 88 held in assembly by a number of screws such as the one illustrated at 90. The upper extrusion 88 includes a longitudinally extending pocket 92 closed by a longitudinally extending strip 94, the pocket 92 being separate from the main cavity containing the block 80 and useful for containing electrical conductors passing between the two ends of the table 18 or between one or the other end of the table and a junction box 96 fixed to one of the guide rails 24 as shown in FIGS. 1, 2 and 3.

As shown in FIGS. 8 and 9, the illustrated end of the main carriage 26 also includes a means 49 for adjusting that end in the Y coordinate direction relative to its point of connection 55 to the Y cable to allow the main carriage to be easily set into exact parallelism with the X axis. A similar means may also be provided at the opposite end of the carriage 26, and if so, by operating both such means the carriage may also be rectilinearly moved in the Y coordinate direction relative to both of its points of attachment to the cable to adjust its position along the Y axis. As shown in detail in FIG. 8, the adjustment means 49 includes a block 85 to which the cable 52 is fixed and which is slidable in the Y coordinate direction relative to the block 80. The block 80 has two ears 81, 81 loosely receiving an adjustment screw 83 restrained against axial movement relative to the block by its head and a collar 87 fixed to its other end. The adjustment screw passes through and threadably engages the block 85 so that rotation of it shifts the block 85 in one direction or the other along the Y axis relative to the block 80 to accordingly shift the associated end of the carriage 26 relative to its point 55 of attachment to the cable 52.

The pen or X carriage 28, as shown in FIG. 9, includes a base plate 97 carrying two sets of two wheels 98, 98 (only one or which sets is shown) for rotation about vertical axes. One set of these wheels engages the rail flanges 78, 78 of the Y carriage as illustrated, and the two wheels of the other non-illustrated set engage the flanges in the same manner to restrain the carriage 28 to movement along the length of the Y carriage 26 in the X coordinate direction. The base plate 97 also carries a pen 100 and a solenoid 101 or other means for moving the pen between the illustrated writing position of FIG. 9, at which it is in writing contact with the paper 34, and a raised non-writing position at which it is out of contact with the paper 34. The pen carriage may also carry one or more limit switches operated by abutments at the opposite ends of the Y carriage 26 to provide signals to the processor indicating initializing or limit positions of the pen carriage in the X coordinate direction. Electrical communication between the pen carriage 28 and the remainder of the table is provided by a flexible wand 102 connected at one end to the junction box 96 and at its other end to the pen carriage 28. The wand 102 has a narrow dimension in a horizontal plane and a much larger dimension in a vertical plane so as to be flexible in a horizontal plane and rigid in a vertical plane to allow it to follow the movement of the pen carriage 28 without sagging vertically. The wand contains a number of electrical conductors sufficient to deliver to or take from the pen carriage 28 the electrical power or signals required for its operation. If the pen of the pen carriage is one having a pressurized ink supply the wand 102 may also include a tube for delivering pressurized air to such ink supply.

The means for removably and rotatively supporting the supply roll 30 is such that during the unwinding of paper from the supply roll a force is applied to the roll opposing its unwinding rotation so that the portion of paper existing between the rolls 30 and 32 is kept in tension and so that when the tension force pulling the paper from the roll disappears the rotation of the roll will immediately stop without overshoot. The means for applying such opposing force may vary and may, for example, comprise the use of an electromechanical brake device. However, the braking means is preferably of a more simple and inexpensive construction as shown in FIG. 5.

Figure 5:
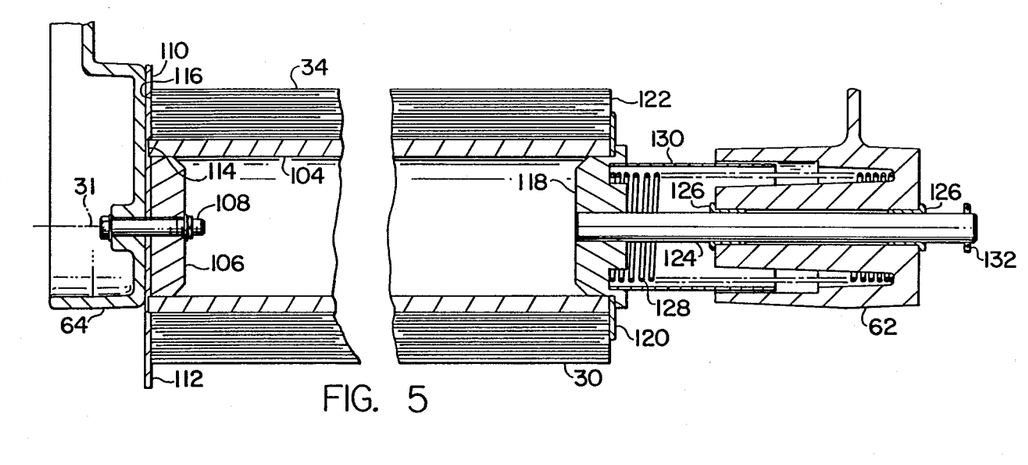
FIG. 5 is a fragmentary vertical sectional view taken with line 5—5 of FIG. 2 showing the supporting means for the paper supply roll,.

Referring to FIG. 5, the supply roll 30 is of the type having a tubular central core 104 of cardboard or the like onto which the paper 34 is wound. At its right-hand end, as seen in FIG. 5, the roll 30 is rotatably slidably supported by a cylindrical plug 106 fixed to the end plate 64 by a bolt 108. Between the plug 106 and the end plate 64 is a disc-shaped friction flange 110 through which the bolt 108 also passes. The bolt 108 fixes both the plug 106 and friction plate 110 to the end plate 64 so that both of those parts are non-rotative relative to the end plate 64 and to the support surface 22. The friction flange 110 has a friction surface 112 which engages the adjacent end 116 of the roll 30. This friction surface may be made in various ways. For example, the flange 110 may be made of aluminum with the surface 112 being formed by first sandblasting that surface and then hard-coating it. As an alternative, the surface 112 may be also formed by a piece of sandpaper adhered to the flange and possibly replaced from time to time as needed to compensate for wear. In any event, the friction surface 112 is a roughened one which when the adjacent end 116 of the roll 30 is pressed against it produces a friction force on the roll opposing unwinding of paper from the roll. Since the paper 34 may sometimes be loosely coupled with the central core 104 it is preferred that the friction force developed by the friction surface 112 be applied directly to the paper 34 and not to the core 104. Also, as shown in FIG. 5, the core 104 sometimes extends outwardly slightly beyond the adjacent edge of the paper wound onto it. Therefore, to allow the friction surface to engage only the paper 34 and not the core 104 the flange 112 is provided with an angular recess 114 to accommodate the outwardly protruding end, if any, of the core 104.

To develop the desired unwinding opposing force on the roll 30 through the use of the friction surface 112 it is necessary that the adjacent end 116 of the roll be pressed against that surface. Also, the friction surface 112 acts as a registration surface to define the Y coordinate position of the adjacent edge of the paper 34, and for it to serve this purpose it is also necessary for the roll 30 to be held against the surface 112. To achieve an urging of the roll against the surface 112, the roll support means at the opposite end of the roll includes a cylindrical plug 118 carrying an annular flange 120. The plug 118 fits closely into the associated end of the tube 104, as shown, with the flange 120 engaging the adjacent end 122 of the roll 30; and the plug and flange are spring biased toward the friction surface 112 so that the roll 30 is likewise urged towards the friction surface to bring the end 116 of the roll into tight engagement with it.

The plug 118 and its associated flange 120 is supported for rotation about the central axis 31 of the roll 30, and also for limited axial movement along such axis, by a shaft 124 supported by the end plate 62 through two bearings 126, 126. A helical spring 128, which at one end engages the plug 118 and at its other end engages the end plate 62, surrounds the shaft 124. A cylindrical shield 130 is fixed to the plug 118 and extends over a portion of the length of the spring 128. The spring 128 works as a compression spring and urges the plug 118 and flange 120 to the left as seen in FIG. 5. Leftward movement of the plug is limited by a pin 132 carried by the right-hand end of the shaft 124 and engageable with the end plate 62 in the limit position. Rightward movement of the plug 118 is limited by engagement of the right-hand end of the shield 130 with the end plate 62. Such limited range of axial movement of the plug 118 is sufficient to allow removal and replacement of a supply roll from and to the plotter. In the removal of the roll 30 the roll is manually pushed to the right as seen in FIG. 5 to compress the spring 128 until the opposite end of the roll moves free of the plug 106. The end of the roll adjacent the plug 106 is then swung laterally until it is out of the way of the plug 106 and other parts of the plotter, and it is then moved generally axially to the left to remove the right-hand end from the plug 118. A reverse procedure is used in loading a new supply roll onto the plotter. To accommodate the fact that the core of the roll may protrude slightly beyond the adjacent edge of the paper, the plug 106 may also carry a flange (not shown) generally similar in shape to the flange 120 in so far as having a recess for accommodating the protruding end of a roll core and a portion beyond such recess for engaging the paper wound on the core so that the force of the spring 128 is applied directly to the paper instead of to the core.

It should be noted that the friction force applied to the end 116 of the supply roll by the friction surface 112 is dependent on the coefficient of friction between the friction surface and the end of the roll and on the force with which the end 116 of the roll is pushed against the friction surface. The friction force is not dependent on the area of co-engagement between the friction surface 112 and the roll end, the force applied to the roll remaining substantially constant despite changes in the diameter of the roll. However, the moment arm by which such friction force is applied to the roll 30 to create a moment opposing rotation of the roll does vary with the roll diameter. That is, the moment opposing rotation is greater when the roll has a large diameter than it is when the roll has a small diameter. The roll also has a larger mass and rotary inertia when of large diameter than when of a smaller diameter. Accordingly, the result of the friction surface 112 is the desirable one of applying a larger rotation opposing moment to the roll 30 when the roll is of large inertia and of applying a lesser rotation opposing moment to the roll when the roll is of smaller inertia, making the friction surface capable of effectively braking the rotation of the supply roll 30 regardless of its diameter or mass.

In addition to the braking moment applied to the supply roll 30 by the friction surface 112, the spring biasing means at the opposite end of the roll may also be designed to apply a moment to the roll opposing unwinding movement of paper from the roll and tending to urge the roll in the winding direction after the pulling of paper from the roll is terminated, thereby keeping tension in the paper existing between the two rolls when the paper is stationary on the support surface. For this purpose, the spring 128 as shown in FIG. 5 is not only a compression spring but is also a torsion spring allowing one of its ends to be twisted torsionally about the axis 31 relative to the other end. The left-hand end of the spring frictionally engages the plug 118 while the right-hand end frictionally engages the end plate 62. As the roll 30 rotates, the spring 128 will be wound up to some degree until frictional slippage occurs at one or the other or both of its ends to limit the torsional moment stored by the spring. The amount by which the spring is wound up before slippage occurs, however, creates a reverse moment on the plug 118 tending to oppose rotation of the roll 30 and urging it in the winding direction after pulling of paper from the roll is terminated.

Figure 6:
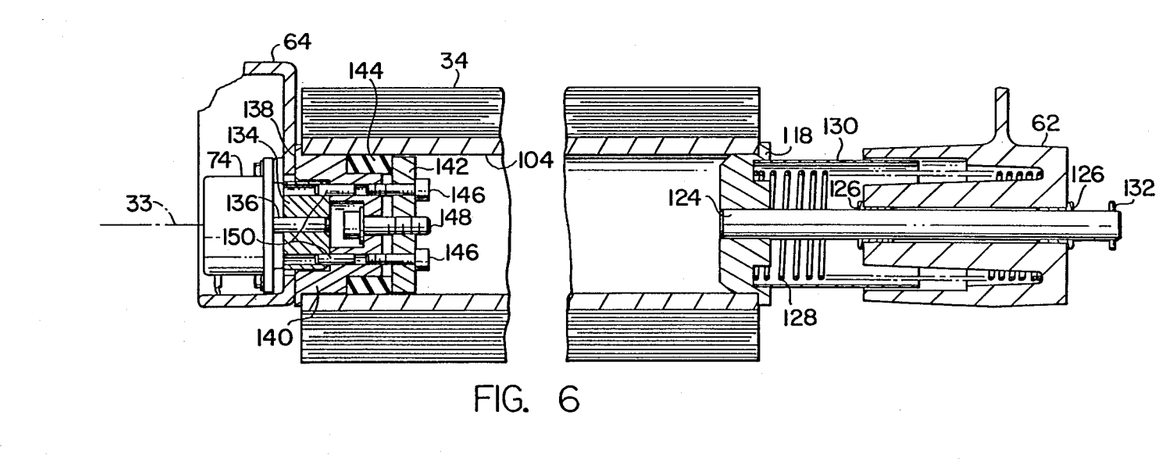
FIG. 6 is a fragmentary vertical sectional view taken on the line 6—6 of FIG. 2 showing the supporting and drive means for the paper take-up roll.

The means for removably and rotatably supporting and driving the take-up roll 32 is shown by FIG. 6. Referring to this figure the take-up roll 32, similarly to the supply roll 30, is of the type having a tubular central core 104 onto which the paper 34 is wound. The left-hand end of the roll is removably coupled to the paper drive motor 74 by a two-part coupling consisting of a cylindrical part 134 fixed to the drive shaft 136 of the motor and an expandable plug 138 removably fixed to the tube 104 of the roll. The expandable plug 138 is inserted into and fixed to the core 104 before the roll 32 is loaded onto the plotter. It consists of two parts 140 and 142 of generally cylindrical construction between which is received a compressible annular body 144 of neoprene or the like. The inner part 142 is supported for axial movement relative to the outer part 140 by two screws 146, 146 threaded into the outer part 140 and slidably passing through the inner part 142. Another screw 148 having a head received in a central recess of the outer part 140 loosely passes through the part 140 and is threaded into the inner part 142. Therefore, by rotating the central screw 148 the inner part 142 may be moved toward or away from the outer part to compress or decompress the annular body 144, increasing or decreasing its diameter, to cause it to grip or release the inner surface of the tube 104. The plug 138 is first inserted into the associated end of the tube 104 with the body 144 in a generally decompressed state. Then the screw 148 is rotated to move the part 142 toward the part 140 to increase the diameter of the body 144 and cause the plug 138 to become non-rotatably fixed to the tube. The plug 138 is then moved into coupled relationship with the part 134 at which a driving connection is made between the part 134 and the plug 138. To effect such driving connection the plug 138 has fixed to it two pins 150, 150 which slidably enter conforming holes in the part 134.

The opposite or right-hand end of the take-up roll 32 is rotatably supported and spring biased toward the left by a means similar to that of FIG. 5 except for not including the annular flange 120 of FIG. 5 on the plug 118. Therefore, the parts of this mechanism have been given the same reference numbers as in FIG. 5 and need not be redescribed. It will be appreciated, nevertheless, that this mechanism allows the take-up roll to be loaded onto and removed from the plotter in the same manner as described for the supply roll of FIG. 5.

It should also be observed, with reference especially to FIG. 3, that the supporting means for the supply roll 30 and for the take-up roll 32 are such that the rolls are supported below the paper support surface 22 and very near to the side edges 40, 40 so that the length of paper existing between the two rolls 30 and 32 is very short, being of a length substantially less than, and preferably less than one half of, the width of the paper. For example in the specific instance mentioned above where the paper width is 80 inches and the spacing between the side edges is 24 ¾ inches the length of paper existing between the rolls is approximately 32 inches. Further, the paper 34, in moving from the supply roll 30 over the support surface 22 to the take-up roll 32, first moves from the supply roll 30 to the leading edge 40 of the support surface 22 along a leading plane 152 so that the paper is bent over the leading edge 40 by some angle A. Further, in moving from the trailing edge 40 of the support surface 22 to the take-up roll 32 the paper moves through a trailing plane 154 having some angle B to the support surface so as to be bent to some degree around such side edge. This shaping of the paper by bending it around the two side edges 40, 40, in conjunction with the fact that the paper has a length between the two rolls and also between the two side edges 40, 40 substantially smaller than its width, gives the paper high strength and stiffness against distortion, particularly against buckling and movement of the paper which engages one side edge parallel to that side edge and relative to the paper which engages the opposite side edge. This paper strength and stiffness therefore minimizes or entirely eliminates tracking errors of the paper. Another factor leading to the good paper tracking ability of the plotter is that the means for supporting the two rolls 30 and 32 are arranged such that the central axes 31 and 33 about which the rolls rotate are made exactly parallel to the side edges 40, 40.

The plotter 16, as previously mentioned, is intended to be operated in a progressive manner so that a drawing drawn on the paper 34 is drawn from one end of the drawing to the other as the paper is moved unidirectionally across the plotting surface 22 in the direction 35. To coordinate the X,Y motion of the pen 36 with the movement of the paper in the direction 35, some means need be provided to inform the processor of the position of the paper in the X coordinate direction as measured between some point fixed on the plotting surface and another point fixed on the paper at the start of a drawing. Various different encoders or position sensors may be used for this purpose without departing from the broader aspects of the invention. However, when the plotter is operated in a sectional manner with intermittent paper advancement alternating with intermittent plotting, it is sufficient for paper position sensing purposes if the paper is advanced a uniform and precise amount in the X coordinate direction during every advancement, the processor then needing to know only the uniform advancement length and the number of advancements to determine paper position.

Figure 10:
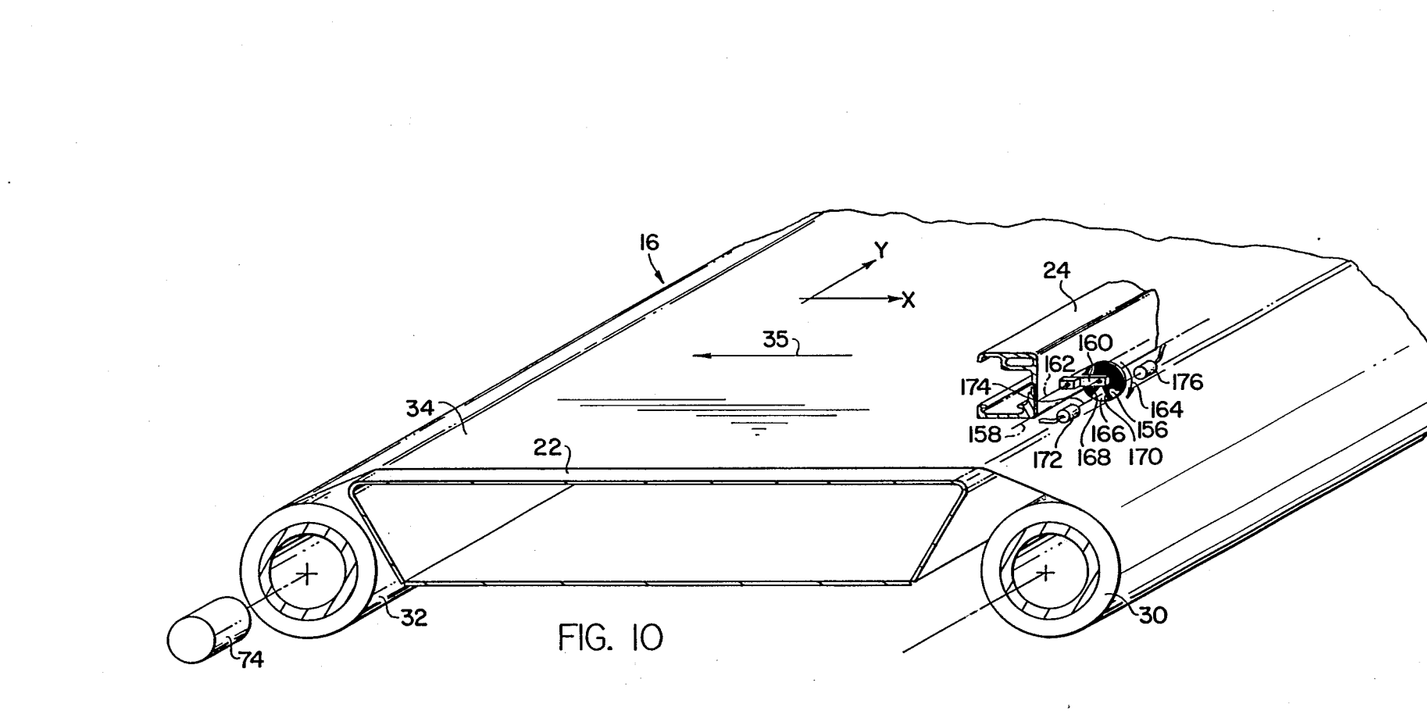
FIG. 10 is a schematic fragmentary perspective view showing parts of the paper advance mechanism.

When the plotter 16 is used in a sectional manner, the means for assuring the advancement of a precise length of paper during each advancement is preferably of a simple construction such shown in FIG. 10 which provides for a two-stage stopping of a paper advancement to reduce or eliminate overshoot in the rotation of either the supply roll 30 or the take-up roll 32 at the end of an advancement. The two-stage stoppage involves the fact that near the end of a paper advancement the speed of the paper is shifted from a high speed to a slower speed and is then shifted from the slower speed to the stop condition. Therefore, at the precise moment when a stop signal is produced the two rolls 30 and 32 are both rotating at relatively slow speed and are capable of being relatively easily stopped without overshoot by the rotation opposing force applied to the supply roll, and also through the paper between the rolls to the take-up roll, by the friction surface 112, and by the braking force applied to the take-up roll 32 by the drive motor 74. As to the latter, the drive motor 74 is preferably one such as a high gear reduction motor which, upon being stopped, holds against high torque the position of its output shaft against movement in either direction.

Referring to FIG. 10, the illustrated mechanism for sensing paper movement comprises a sensing wheel 156 supported for rotation about an axis 158, parallel to the Y coordinate axis, by an arm 160 pivotally connected to the right-hand or leading guide rail 24 for pivotal movement about an axis 162. The weight of the arm 160 and of the wheel 156, and possibly the biasing force of an additional spring if needed, urges the periphery of the wheel into engagement with the paper 34 so that the wheel is rotated in response to paper movement in the direction shown by the arrow 164.

The sensing wheel 156 is optically opaque except for including one transparent window 166 having a radial leading edge 168 and a radial trailing edge 170. On one side of the wheel is a light source 172 emitting a beam 174 of light toward a light sensor 176 located on the opposite side of the wheel. Therefore, one output signal is produced by the light sensor each time the leading edge 168 passes the light beam 174 and another signal each time the trailing edge 170 passes the light beam 174. These two signals are used respectively to signal the slowing down of the speed of paper advancement and the stoppage of paper advancement. The diameter of the sensing wheel may be such that it rotates only once during each advancement. However, preferably the diameter is selected so that the wheel rotates a number of times, for example four times, during a single advancement.

Assuming that the sensing wheel does rotate four times during a paper advancement, the operation of the plotter is generally as follows. After completing the drawing required for the section of paper then positioned at the support surface 22, the processor contained in the control unit 69 produces an advancement initiating signal. In response to this signal the drive motor 74 is driven at a relatively high speed to rotate the take-up roll 32 in the winding direction to cause paper to move over the support surface 22 in the direction 35 at a correspondingly high speed and to be pulled from the supply roll 30. As this paper advancement occurs the sensing wheel rotates with the paper and the processor keeps track of the number of revolutions occurring by counting the signals produced by the light sensor 176. After the third revolution of the sensing wheel is completed and sensed the processor knows that at the end of the next revolution the advancement is to be stopped. Accordingly, when the sensor 176 next detects the passage of the leading edge of the aperture 166, that signal is used to immediately cause a slowing of the speed of the drive motor 74 so the that the speed of movement of the paper is likewise reduced. Soon after this slowing of the paper speed occurs the sensor 176 senses the trailing edge 170 of the aperture and in response to the signal so produced the drive motor 74 is immediately stopped to stop rotation of the take-up roll 32 and pulling of paper from the supply roll 30. Then plotting again resumes with the pen drawing on the section of paper now on the plotting surface. After this portion of the plotting is completed another advancement of the paper takes place, with the process of intermittent plotting and paper advancement being repeated until the entire drawing is finished.

An advantage of the use of the sensing wheel 156 in conjunction with the remainder of the control system for the plotter is that the processor may be instructed by manual input as to the length of a standard paper advancement, such instructions as to length of a standard advancement then being used by the processor to divide the drawing data in sections having such standard length. Therefore, if sensing wheels vary slightly in size when installed or change size because of wear during use, the processor can be adjusted to match the standard advancement length which it uses and which is stored in its memory by it to the actual advancement length represented by rotation of the associated sensing wheel through the four or other given number of revolutions assigned to each advancement.

In the claims which follow, the terms "paper" and "pen" have been used for convenience of expression and are intended to broadly comprehend any type of sheet material or writing instrument which may be used in combination with the other claimed components of a plotter to produce graphics on the sheet material.

I claim:

1. A plotter for producing graphics on an elongated sheet of paper, said plotter comprising: means providing a paper support surface, means for moving an elongated sheet of paper over said support surface in one direction parallel to the longitudinal axis of the paper, two parallel guide rails fixed relative to said support surface perpendicular to said direction of paper movement, an elongated main carriage extending between said guide rails parallel to said direction of paper movement and supported at its opposite ends by said guide rails for movement in a Y coordinate direction along the length of said guide rails said main carriage having a given range of movement in said Y coordinate direction and said guide rails being spaced from one another along said direction of paper movement by a distance less than said range of movement of said main carriage in the Y coordinate direction, a pen, a pen carriage carrying said pen and supported on said main carriage for movement along said main carriage in the X coordinate direction parallel to said direction of paper movement, and means for moving said main carriage and said pen carriage in said Y and X coordinate directions respectively to draw lines with said pen on paper supported by said support surface.

2. A plotter as defined in claim 1 further characterized by said means providing a paper support surface also providing parallel side edges for said support surface extending perpendicular to said direction of paper movement, and said means for moving an elongated sheet of paper over said support surface including means for supporting a supply roll of paper near one of said side edges and a take-up roll of paper adjacent the other of said side edges, said side edges being so spaced from one another and said rolls of paper being so spaced from said edges that the length of paper which exists between said two rolls is less than said range of movement of said main carriage in the Y coordinate direction.

3. A plotter as defined in claim 2 further characterized by the arrangement of said side edges and of said rolls being such that the length of paper which exists between the said rolls is less than ½ the range of movement of said main carriage in the Y coordinate direction.

4. A plotter as defined in claim 2 further characterized by said means for moving an elongated sheet of paper over said support surface including a means for keeping tension in the length of paper which exists between said supply roll and said take-up roll.

5. A plotter as defined in claim 4 further characterized by said means for moving an elongated sheet of paper over said support surface including means for supporting said supply roll and said take-up roll so that the central axes of said rolls are parallel to one another and to said side edges of said support surface.

6. A plotter as defined in claim 5 further characterized by said supply roll and said take-up roll being so located that the paper which exists between said supply roll and said take-up roll passes over said support surface and is bent to some degree around each of said side edges.

7. A plotter as defined in claim 1 further characterized by said means for moving an elongated sheet of paper over said support surface being a means for moving said paper intermittently to successively bring new sections of said paper to said support surface, and said means for moving said main carriage and said pen carriage including a means for controlling said main and pen carriage so as to draw lines on the paper between periods of paper advancement over said support surface.

8. A plotter as defined in claim 1 further characterized by said guide rails being spaced from one another by a distance less than ½ the range of movement of said main carriage along said guide rails in the Y coordinate direction.

9. A plotter as defined in claim 1 further characterized by said guide rails being spaced from one another by a distance d and the length of the range of said main carriage along said guide rails in the Y coordinate direction being approximately 3 ½ d.

10. A plotter defined in claim 1 further characterized by said support surface providing means also providing straight parallel side edges at the leading and trailing sides of said support surface, and said means for moving paper over said support surface being such that as said paper is moved onto and off of said support surface it is bent over said two straight parallel side edges at the leading and trailing sides of said support surface.

11. A plotter as defined in claim 10 further characterized by said leading and trailing side edges of said support surface being spaced from one another by a distance less than ½ the length of said range of movement of said main carriage along said guide rails in the Y coordinate direction.

12. A plotter as defined in claim 11 further characterized by said side edges each having a radius of curvature of less than one inch.

13. A plotter as defined in claim 12 further characterized by said means for moving paper over said support surface including means for supporting a supply roll of paper adjacent said leading side edge of said support surface for rotation about its central axis, and means for supporting a take-up roll of paper adjacent said trailing side edge of said support surface for rotation about its central axis.

14. A plotter as defined in claim 13 further characterized by said means for supporting a supply roll of paper and said means for supporting a take-up roll of paper being such that when supply and take-up rolls of paper are supported by said means the central axes of the two rolls of paper are parallel to one another and to said leading and trailing side edges of said support surface.

15. A plotter as defined in claim 13 further characterized by said means for moving paper over said support surface including means for driving a take-up roll supported by said take-up roll supporting means about its central axis so as to wind paper on said take-up roll and to thereby move paper over said support surface while pulling it from a supply roll supported by said supply roll supporting means.

16. A plotter as defined in claim 15 further characterized by said means for supporting a supply roll of paper including a friction surface fixed relative to said support surface and arranged to engage one end of a supply roll supported by said supply roll supporting means, and means for spring biasing the other end of such supply roll toward said friction surface so as to urge the end of the supply roll which is adjacent to said friction surface against said friction surface to yieldingly resist rotation of said supply roll.

17. A plotter as defined in claim 16 for use with supply rolls of paper of the type wherein the paper is wound on a tubular central core, said plotter being further characterized by said friction surface of said supply roll supporting means engaging only the paper portion of a supply roll supported by said supply roll supporting means without engaging the tubular core of such roll.

18. A plotter as defined in claim 15 further characterized by said means for supporting a supply roll of paper including means providing flanges at opposite end of a supported supply roll, one of said flanges being a friction flange fixed relative to said support surface, and means supporting the other of said flanges for rotation with said supply roll, said means for supporting said other flange including a part fixed relative to said support surface, and a helical compression/torsion spring between said other flange and said part, said helical compression/torsion spring urging said other flange toward said friction flange and the ends of said helical compression/torsion spring bearing respectively against said other flange and said part so that as said other flange rotates with a supply roll said helical compression/torsion spring winds up to some degree to exert a torsional moment on said other flange opposing unwinding rotation of the supply roll supported by the supply roll supporting means and biasing such supply roll in the winding direction when unwinding of paper from the supply roll is stopped.

19. A plotter as defined in claim 15 further characterized by said means for moving paper including means for initiating an advancement of paper, a paper advance sensing means, and means responsive to said sensing means for slowing the advancement speed of said paper when the paper has undergone a first predetermined amount of advancement from the start of the advancement and for stopping advancement when the paper has undergone a second predetermined amount of advancement from the start of the advancement.

20. A plotter as defined in claim 19 further characterized by said paper advance sensing means including a sensing wheel which engages and is rotated by the paper as the paper advances, said sensing wheel having an optical window with leading and trailing edges sensed by an optical detector, said sensing wheel being of such diameter as to rotate through a number or revolutions during one paper advancement, sand said means responsive to said sensing means for slowing the advancement of said paper including control means associated with the said sensing wheel operating so that during the last revolution of said wheel in a given advancement the speed of advancement is shifted from a high speed to a low speed when the leading edge of said window is detected by said optical detector and is shifted from said low speed to stop when said trailing edge of said window is detected by said detector.

21. A plotter as defined in claim 1 further characterized by said guide rails being spaced from one another along said direction of paper movement by a distance less than ½ the range of movement of said elongated main carriage along said guide rails in the Y coordinate direction, said means providing said support surface also providing straight parallel side edges at the leading and trailing sides of said support surface, said leading and trailing side edges each having a radius of curvature of less than ½ inch, said side edges being spaced from one another by a distance less than the range of movement of said elongated main carriage along said guide rails in the Y coordinate direction, said means for moving a paper over said support surface including means for supporting a supply roll of paper adjacent said leading side edge of said support surface and means for supporting a take-up roll of paper adjacent said trailing side edge of said support surface, said means for supporting a supply roll including a friction flange fixed relative to said supporting surface for engaging one end of a supported supply roll and means at the other end of said supply roll for spring biasing such supply roll toward said friction flange, means for driving said take-up roll to move paper over said support surface, means for initiating an advancement of paper, a paper advance sensing means, and means responsive to the sensing means for slowing the advancement of paper when the paper has undergone a first predetermined amount of advancement from the start of an advancement and for stopping advancement of paper when the paper has undergone a second predetermined amount of advancement from the start of an advancement.

22. A plotter as defined in claim 21 further characterized by said paper advance sensing means including a sensing wheel which engages and is rotated by said paper as the paper advances, said sensing wheel having an optical window with leading and trailing edges sensed by an optical detector, said sensing wheel being of such diameter as to rotate through a number of revolutions during one paper advancement, and control means associated with the said sensing wheel operating so that during the last revolution of said wheel in a given advancement of paper the speed of advancement of said paper is shifted from a high speed to a low speed when the leading edge of said window is detected by said optical detector and is shifted from said low speed to stop when said trailing edge of said window is detected by said detector.

23. A plotter as defined in claim 22 for use with supply rolls of paper of the type wherein the paper is wound on a tubular central core, said plotter being further characterized by said friction flange of said supply roll supporting means having a friction surface which engages only the paper portion of a supply roll supported by said supply roll supporting means without engaging the tubular core of such roll.

24. A plotter as defined in claim 1 further characterized by said means for moving said main carriage and said pen carriage including a cable drive means for moving said main carriage in the Y coordinate direction relative to said support surface, said cable drive means including a cable having one portion extending parallel to the Y coordinate direction adjacent one end of said main carriage and a second portion extending parallel to the Y coordinate direction adjacent the other end of said main carriage, both of which portions move in the same direction as said carriage is moved along the Y coordinate axis, means for fixing each end of said main carriage to the adjacent one of said cable portions, at least one of said fixing means including means for adjusting in the Y coordinate direction the adjacent end of the main carriage relative to the point at which it is attached to the cable portion.

25. A plotter as defined in claim 1 further characterized by said means for moving said main carriage and said pen carriage including a cable drive means for moving said main carriage in the Y coordination direction relative to said support surface, said cable drive means including a cable having one portion extending parallel to the Y coordinate direction adjacent one end of said main carriage and a second portion extending parallel to the Y coordinate direciton adjacent the other end of said main carriage, both of which portions move in the same direction as said carriage is moved along the Y coordinate axis, means for fixing each end of said main carriage to the adjacent one of said cable portions, said means for attaching each end of said main carriage to the adjacent portion of said cable at both ends of said carriage including a means for adjusting in the Y coordinate direction the adjacent end of the carriage relative to the point at which it is fixed to the adjacent cable portion.

26. A plotter for producing graphics on an elongated piece of paper having a longitudinal axis, said plotter comprising: means providing a paper support surface, means for moving paper lengthwise of itself over said support surface, a pen for drawing lines on paper supported by said support surface, means for moving said pen relative to said support surface, said pen moving means having a given range of movement in a direction perpendicular to said direction of paper movement over said support surface, said support surface providing parallel leading and trailing side edges for said support surface spaced from one another by a distance less than said given range of movement of said pen in the direction perpendicular to the direction of paper movement, and said means for moving said paper including means for supporting a supply roll of paper adjacent said leading side edge of said support surface for rotation about its central axis and for supporting a take-up roll of paper adjacent said trailing side edge of said support surface for rotation about its central axis, said supply roll and take-up roll supporting means being such that the supply and take-up rolls are both located below said support surface wit their central axes parallel to said side edges so that paper in passing from said supply roll to said take-up roll moves from said supply roll to said leading side edge through a leading plane having some angle to said support surface and so that the paper moves from said trailing side edge of said support surface to said take-up roll through a trailing plane having some angle to said support surface, said leading and trailing side edges of said support surface each having a radius of curvature of less than one inch, said means for moving paper also including means for driving said take-up roll to move paper across said support surface, said means for supporting a supply roll including a friction surface fixed relative to said support surface for engaging one end of a supply roll supported by said supporting means and a means for spring biasing the opposite end of each supply roll toward said friction surface.

27. A plotter as defined in claim 26 further characterized by said leading and trailing side edges of said support surface each having a radius of curvature of less than one inch.

28. A plotter as defined in claim 26 further characterized by said leading and trailing side edges of said support surface being spaced from one another by a distance equal to less than ½ the range of movement of said pen in said direction perpendicular to the direction of movement of said paper over said support surface.

29. A plotter as defined in claim 26 further characterized by means for initiating an advancement of paper over said support surface, a paper advance sensing means, and means responsive to said sensing means for slowing the advancement of said paper when the paper has undergone a first predetermined amount of advancement form the start of the advancement and for stopping the advancement of paper when said paper has undergone a second predetermined amount of advancement from the start of an advancement.

30. A plotter for producing graphics on an elongated piece of paper having a longitudinal axis, said plotter comprising: means providing a paper support surface, means for moving paper lengthwise of itself over said support surface, a pen for drawing lines on paper supported by said support surface, means for moving said pen relative to said support surface, said pen moving means having a given range of movement in a direction perpendicular to said direction of paper movement over said support surface, said support surface providing parallel leading and trailing side edges for said support surface spaced from one another by a distance less than said given range of movement of said pen in the direction perpendicular to the direction of paper movement, and said means for moving said paper including means for supporting a supply roll of paper adjacent said leading side edge of said support surface for rotation about its central axis and for supporting a take-up roll of paper adjacent said trailing side edge of said support surface for rotation about its central axis, said supply roll and take-up roll supporting means being such that the supply and take-up rolls are both located below said support surface with their central axes parallel to said side edges so that paper in passing from said supply roll to said take-up roll moves from said supply roll to said leading side edge through a leading plane having some angle to said support surface and so that the paper moves from said trailing side edge of said support surface to said take-up roll through a trailing plane having some angle to said support surface, said means for supporting a supply roll of paper including means providing flanges at opposite ends of a supported supply roll, one of said flanges being a friction flange fixed relative to said support surface, means supporting the other of said flanges for rotation with said supply roll, and said means for supporting said other flange including a part fixed relative to said support surface, and a helical compression/torsion spring between said other flange and said part, said helical compression/torsion spring urging said other flange toward said friction flange and the ends of said helical compression/torsion spring bearing respectively against said other flange and said part so that as said other flange rotates with a supply roll said helical compression/torsion spring winds up to some degree to exert a torsional moment on said other flange opposing unwinding rotation of the supply roll supported by the supply roll supporting means and biasing such supply roll in the winding direction when unwinding of paper from the supply roll is stopped.

31. A plotter for producing graphics on an elongated piece of paper having a longitudinal axis, said plotter comprising: means providing a paper support surface, means for moving paper lengthwise of itself over said support surface, a pen for drawing lines on paper supported by said support surface, means for moving said pen relative to said support surface, said pen moving means having a given range of movement in a direction perpendicular to said direction of paper movement over said support surface, said support surface providing parallel leading and trailing side edges for said support surface spaced from one another by a distance less than said given range of movement of said pen in the direction perpendicular to the direction of paper movement, and said means for moving said paper including means for supporting a supply roll of paper adjacent said leading side edge of said support surface for rotation about its central axis and for supporting a take-up roll of paper adjacent said trailing side edge of said support surface for rotation about its central axis, said supply roll and take-up roll supporting means being such that the supply and take-up rolls are both located below said support surface with their central axes parallel to said side edges so that paper in passing from said supply roll to said take-up roll moves from said supply roll to said leading side edge through a leading plane having some angle to said support surface and so that the paper moves from said trailing side edge of said support surface to said take-up roll through a trailing plane having some angle to said support surface, said means for moving said pen including two guide rails extending over said support surface parallel to said leading and trailing edges of said support surface, said guide rails being fixed relative to said support surface and being spaced from one another in the direction of paper movement over said support surface, an elongated main carriage extending between said two guide rails in the direction parallel to the direction of movement of paper over said support surface and supported at its opposite ends by said guide rails for movement along said guide rails in the direction perpendicular to the direction of paper movement, and a pen carriage carrying said pen supported on said main carriage for movement along said main carriage in the direction parallel to the direction of paper movement over said support surface.

32. A plotter for producing graphics on an elongated piece of sheet material having a longitudinal axis, said plotter comprising: means providing a paper support surface, means for supporting a supply roll of paper arranged so that paper unwound from said supply roll moves over said support surface, means downstream of said support surface for pulling paper to unwind it from said supply roll and to move it across said support surface, a paper advance sensing wheel engaging paper movement over said support surface and rotated by such paper as the paper advances, means for initiating an advancement of paper over said support surface, means for slowing the speed of advancement of paper in response to said sensing wheel having undergone a first predetermined amount of rotation from the start of the advancement and for terminating the advancement of paper in response to said sensing wheel having undergone a second predetermined amount of rotation from the start of the advancement, said means for supporting a supply roll including a friction surface fixed relative to said support surface for engaging one end of a supply roll supported by said supporting means and means for spring biasing the opposite end of such supply roll toward said friction surface.

33. A plotter for producing graphics on an elongated piece of sheet material having a longitudinal axis, said plotter comprising: means providing a paper support surface, means for supporting a supply roll of paper arranged so that paper unwound from said supply roll moves over said support surface, means downstream of said support surface for pulling paper to unwind it from said supply roll and to move it across said support surface, a paper advance sensing wheel engaging paper moving over said support surface and rotated by such paper as the paper advances, means for initiating an advancement of paper over said support surface, means for slowing the speed of advancement of paper in response to said sensing wheel having undergone a first predetermined amount of rotation from the start of the advancement and for terminating the advancement of paper in response to said sensing wheel having undergone a second predetermined amount of rotation from the start of the advancement, said means for supporting a supply roll of paper including means providing flanges at opposite ends of a supported supply roll, one of said flanges being fixed relative to said support surface, and means supporting the other of said flanges for rotation with said supply roll, said means for supporting said other flange including a part fixed relative to said support surface, and a helical compression/torsion spring between said other flange including a part fixed relative to said support surface, and a helical compression/torsion spring between said other flange and said part, said helical compression/torsion spring urging said other flange toward said fixed flange and the ends of said helical compression/torsion spring bearing respectively against said other flange and said part so that as said other flange rotates with a supply roll said helical compression/torsion spring winds up to some degree to exert a torsional moment on said other flange opposing unwinding rotation of the supply roll supported by the supply roll supporting means and biasing such supply roll in the winding direction when unwinding of paper from the supply roll is stopped.

34. A plotter for producing graphics on an elongated piece of sheet material having a longitudinal axis and for use with supply rolls of paper of the type wherein the paper is wound on a tubular central core, said plotter comprising: means providing a paper support surface, means for supporting a supply roll of paper arranged so that paper unwound from said supply roll moves over said support surface, means downstream of said support surface for pulling paper to unwind it from said supply roll and to move it across said support surface, a paper advance sensing wheel engaging paper moving over said support surface and rotated by such paper as the paper advances, means for initiating an advancement of paper over said support surface, means for slowing the speed of advancement of paper in response to said sensing wheel having undergone a first predetermined amount of rotation from the start of the advancement and for terminating the advancement of paper in response to said sensing wheel having undergone a second predetermined amount of rotation from the start of the advancement, said means for supporting a supply roll including a friction surface fixed relative to said support surface for engaging one end of a supply roll supported by said supporting means and means for spring biasing the opposite end of such supply roll toward said friction surface, said friction surface of said supply roll supporting means being of such shape and arrangement as to engage only the paper portion of a supply roll supported by said supply roll supporting means without engaging the tubular core of such roll.

35. A plotter as defined in claim 34 further characterized by means for supporting a take-up roll of paper downstream of said paper support surface, and said means downstream of said support surface for pulling paper including means for driving said take-up roll.

* * * * *